United States Patent [19]
Briggs

[11] Patent Number: 4,944,214
[45] Date of Patent: Jul. 31, 1990

[54] BRAKE SERVO BOOSTER

[75] Inventor: Stuart J. Briggs, Gwent, Great Britain

[73] Assignee: Lucas Industries Public Limited Company, Birmingham, England

[21] Appl. No.: 264,985

[22] Filed: Oct. 31, 1988

[30] Foreign Application Priority Data

Nov. 14, 1987 [GB] United Kingdom ............... 8726722

[51] Int. Cl.⁵ .............................................. F01B 19/00
[52] U.S. Cl. ...................................... 92/98 R; 92/96; 92/165 PR; 91/376 R
[58] Field of Search ................... 92/96, 98 R, 165 PR, 92/168, 169.1, 169.2, 169.3, 161, 146; 91/376 R, 369 R, 369.2, 369.3

[56] References Cited

U.S. PATENT DOCUMENTS

| 4,398,449 | 8/1983 | Takayama et al. | 91/376 R |
| 4,418,611 | 12/1983 | Tateoka et al. | 92/165 PR |
| 4,542,680 | 9/1985 | Takeuchi | 92/169.1 |
| 4,690,034 | 9/1987 | Ando et al. | 91/376 R |

FOREIGN PATENT DOCUMENTS

| 0164198 | 12/1985 | European Pat. Off. | 91/369.2 |
| 2093136 | 8/1982 | United Kingdom | 92/169.3 |
| 2122705 | 1/1984 | United Kingdom | 92/169.1 |

Primary Examiner—Edward K. Look
Assistant Examiner—Thomas Denion
Attorney, Agent, or Firm—Fleit, Jacobson, Cohn, Price, Holman & Stern

[57] ABSTRACT

A brake servo booster has a housing (1) divided into two chambers (A, B) by a movable partition (5) which includes a diaphragm (6). A protective boot (14) for a support member (11) extending through the housing is connected to the diaphragm by a carrier member (16) engaged by adjacent portions (14A, 6A) of the boot and diaphragm in a manner which avoids direct contact between these portions and facilitates assembly of the booster.

17 Claims, 2 Drawing Sheets

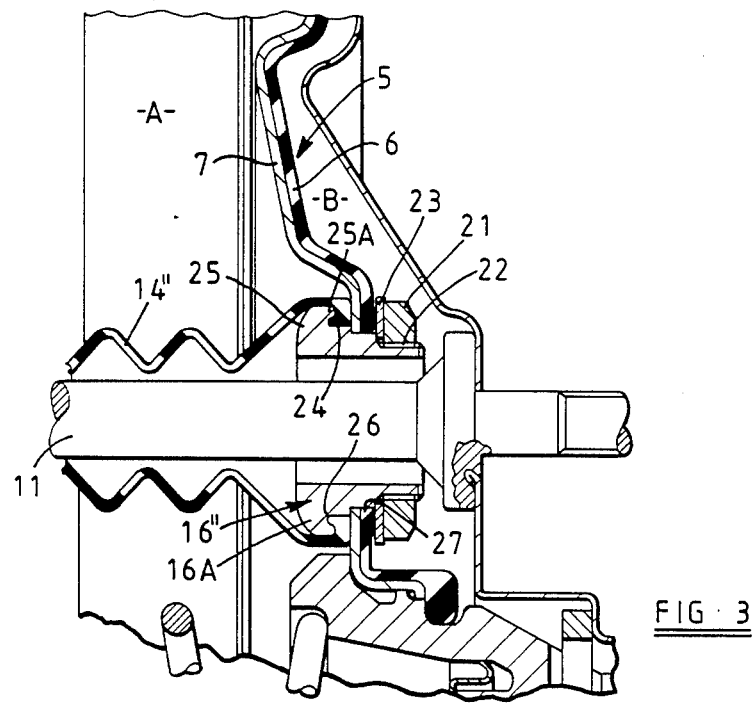
FIG. 3
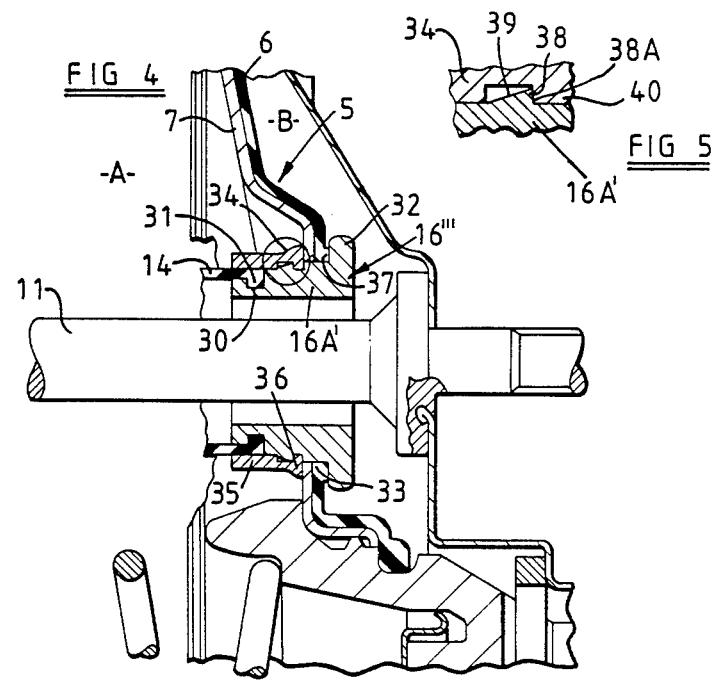
FIG. 4
FIG. 5

BRAKE SERVO BOOSTER

BACKGROUND OF THE INVENTION

This invention relates to a brake servo booster, primarily for use in a vehicle braking system and of the general kind comprising a housing divided into a pair of chambers by a movable partition which includes a diaphragm secured in sealed manner to the housing, the partition being operatively connected to a force output member for the transmission of a power assistance force to a brake master cylinder, a support member extending through the partition and serving to connect the booster, in use, to a fixed support, and a protective boot extending longitudinally of the support member and surrounding an external surface thereof, the boot being connected at its end regions respectively to the support member and to the partition.

Examples of an arrangement of this general kind are illustrated in our British Patent No. 2093136 in which a protective boot has one of its end regions secured directly to the partition diaphragm. While this produces a satisfactory operational arrangement, difficulty can be experienced in assembling the boot on to the diaphragm, largely due to the nature of the material employed for these components, being usually rubber or plastics, for example, in practice, and the shapes of their interengaging parts which cannot readily be manipulated on an assembly line.

BRIEF SUMMARY OF THE INVENTION

An object of the present invention is to provide a brake servo booster of the aforesaid general kind in which the aforesaid difficulty is alleviated.

According to the invention, a brake servo booster of the aforesaid general kind has the protective boot connected to the partition by way of a carrier member engaged by adjacent portions of the boot and diaphragm.

In one convenient arrangement, parts of the boot and diaphragm are press-fitted into respective formations in the carrier member.

The carrier member may include a retention device such as to hold the boot and diaphragm in place on the main body of the carrier member. Typically, the retention device is such as to be attached to the main body by a screw threaded connection, or to be snap-engaged thereon.

BRIEF DESCRIPTION OF THE DRAWINGS

The invention will now be described, by way of example, with reference to the accompanying drawings wherein:

FIGS. 3 and 4 are part-longitudinal cross-sectional views similar to FIG. 1, enlarged, respectively of two further alternative embodiments of the invention, and FIG. 5 is an enlarged cross-sectional view of the encircled part of the embodiment of FIG. 4.

DETAILED DESCRIPTION

Figure 1:
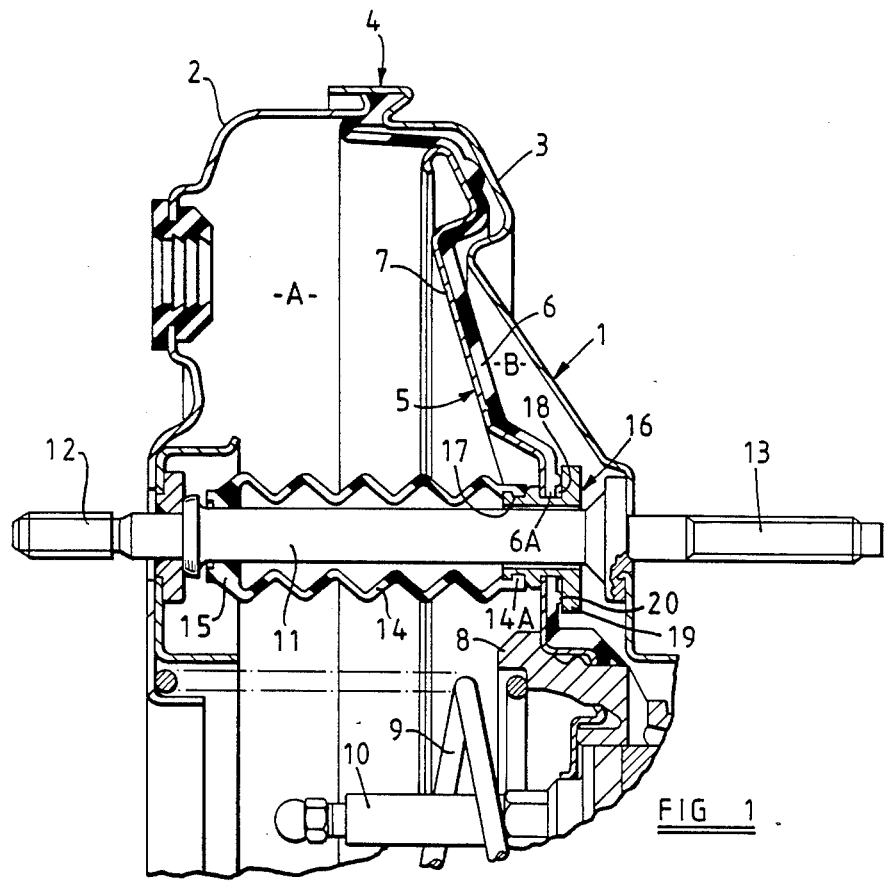
FIG. 1 is a longitudinal cross-sectional view of one form of the brake servo booster of the invention.

The servo booster illustrated in FIG. 1 of the drawings has a housing 1 composed of front and rear shells 2 and 3 which are joined around their outer peripheries at 4. The interior of the housing is divided into two chambers A, B by a diaphragm assembly 5 which includes a flexible diaphragm 6 and a relatively rigid diaphragm support plate 7, the diaphragm 6 being trapped around its outer periphery at the joint 4 between the housing shells 2 and 3. The backing plate 7 is supported in its central region on an axially reciprocable boss 8 which extends therethrough and which is urged to the right, as seen in the drawing, by a coil spring 9 acting between the boss and an internal surface portion of the shell 2. Retained within the boss 8 is force output rod 10 which would be connected, in use, to a piston of a master cylinder (not shown) forming part of a vehicle hydraulic braking system.

A plurality of support members, of which one is illustrated as a tie rod 11, extend axially through the housing 1 and diaphragm assembly 5 and are secured to the shells 2 and 3 in conventional manner. Outwardly extending threaded end portions 12 of the tie rods would normally be secured, in use, to the master cylinder. Similar oppositely extending threaded end portions 13 of the tie rods would normally be secured, in use, to a vehicle bulkhead, in order to support the servo booster in position on the vehicle. In addition to their supporting function, the tie rods also serve to transmit braking reaction forces arising in the master cylinder to the bulkhead so that the relatively flimsy housing is relieved of such forces.

Each of the tie rods 11 is surrounded by a convoluted resilient boot 14, the left hand end of which is provided with a bead 15 which seals directly onto the outer surface of the rod. The right hand end of the boot is connected to the diaphragm 6 by way of an intermediate carrier member, illustrated generally at 16, which is in the form of a generally annular body, conveniently of plastics material, surrounding the tie rod 11 and having a pair of axially spaced peripheral grooves 17, 18 in its outer surface and terminating at its right hand end in a radial flange 19 which forms one side of the groove 18. The extreme right hand end portion of the boot 14 is provided with a bead 14A which is press-fitted into the groove 17 in order to attach the boot 14 to the carrier member 16. The diaphragm assembly 5 is similarly push-fitted into the groove 18 and a sealing formation, illustrated as a concentric annular rib 20 near the inner periphery of the diaphragm 6, is resiliently urged firmly into contact with the flange 19 in order to provide a fluid-tight barrier between the chambers A and B. It will be seen that the boot 14 and diaphragm 6 are joined together via the member 16 without mutual contact and assembly of these components during manufacture is thereby facilitated.

Figure 2:
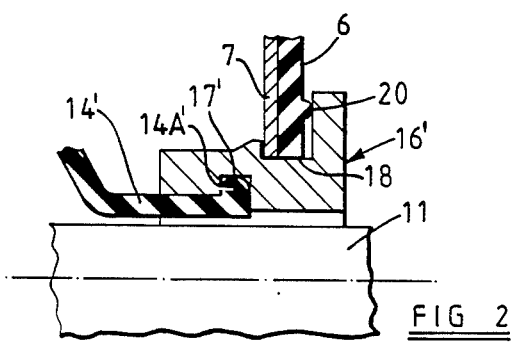
FIG. 2 is an enlarged cross-sectional view of part of an alternative embodiment of the invention.

FIG. 2 illustrates an arrangement similar to FIG. 1 but in which the end portion of the boot 14' lies internally of the carrier member 16, the groove 17' being formed, in this case, internally of the member 16' to receive the boot bead 14A'. The groove 18 housing the diaphragm assembly 5 is identical with that described in FIG. 1.

In the alternative embodiment illustrated in FIG. 3, the carrier member 16' is in two parts, one being a body 16A serving to support the boot 14' and diaphragm assembly 5 and the other being a clamping nut 21 which is screwed onto an externally threaded part 22 of the body 16A to clamp the mounted parts of the boot and diaphragm assembly securely in position on the body 16A. An intermediate washer 23 is provided between the nut and adjacent portion of the diaphragm 6 to avoid rotating the nut against the material of the diaphragm. The free end portion of the threaded part 22 may be peened over behind the nut to provide security against loosening of the nut, in use. The end portion of the boot which is mounted on the body 16A is provided with a hook-shaped bead 24 which embraces a flanged head 25 of the body 16A, a nose 26 of the bead 24 engaging behind the flange 25A of the flanged head 25 to provide a degree of radial retention of the bead. In this embodiment, the diaphragm support plate 7 engages the bead 24 of the boot and thereby transmits to the bead the clamping force exerted by the nut 21. A swelling 27 at the radially inner extremity of the diaphragm 6 again completes a fluid tight seal between the chambers A and B.

In a modification of the FIG. 3 arrangement, the portion 22 of the body 16A may be unthreaded and the nut 21 replaced by a washer placed on the portion 22 in clamping engagement against the diaphragm. The portion 22 is then peened over against the washer to retain the latter in its clamping position. The washer 23 of FIG. 3 would not normally be required in this modification.

FIGS. 4 and 5 illustrate a further alternative embodiment employing a two-piece carrier member, illustrated generally at 16'41. In this arrangement the main body 16A' of the member 16''' is provided with a retaining groove 30 into which a bead 31 of the boot 14 is press-fitted, in a manner similar to the embodiment of FIG. 1. The body 16A' is provided with a radially outwardly projecting flange 32 against which the inner peripheral portion of the diaphragm assembly 5 is positioned, the assembly being supported on an adjacent cylindrical surface portion 33 of the member 16'''. The other component of the carrier member 16''' is a clamping ring 34 which has a cylindrical portion 35 extending over the bead 31 of the boot 14 to retain the bead in position within the groove 30. The ring 34 also has an enlarged end portion 36 which abuts against the support plate 7 of the diaphragm assembly 5 to urge the latter firmly into engagement with the flange 32. A swelling 37 on the diaphragm 6 provides a seal between the chambers A and B, as before.

As will be seen more clearly from FIG. 5, the body 16A' is provided with a ramp 38 having a surface 39 inclined radially outwardly in a direction towards the diaphragm assembly 5. The portion of the clamping ring 34 adjacent the diaphragm assembly provides a shoulder 40 which is engaged behind the adjacent end 38A of the ramp 38. The part of the device 34 carrying the shoulder 40 is longitudinally split at one or more locations spaced circumferentially therearound so as effectively to form a plurality of arms (not shown), and the ring 34 is assembled onto the body 16A by urging it over the ramp 39, which causes the shoulder portions 40 to be resiliently outwardly deflected and subsequently to snap-engage by resilient recovery behind the ramp end 38A. The boot 14 and diaphragm assembly are thereby effectively locked together in a simple and convenient manner.

The invention is found to provide an efficacious way of connecting together the boot 14 and diaphragm 6, avoiding the direct contact between these two components found in some prior art devices which gives rise to assembly difficulties. By way of the invention, the boot and diaphragm can be readily and conveniently connected together on an assembly line, in the manner described. Although the carriers 16 have been illustrated in the above described embodiments as surrounding the tie rods 11 with radial clearance, it would be possible for the carriers to be slidably engaged on the tie rods in order to afford additional support and guidance for the movable partition. The internal bearing surfaces of the carriers could be continuous or in divided portions formed on internal ribs or other formations on the carriers, the latter arrangement providing communication passages through the carriers.

I claim:

1. A brake servo booster comprising:
   a housing;
   a movable partition in said housing dividing said housing into a pair of chambers, said partition including a diaphragm secured in sealing relationship to said housing and being operatively connected to a force output member for the transmission of a power assistance force to a brake master cylinder;
   at least one support member extending through said partition for connecting the booster, in use, to a fixed support, said at least one support member having an external surface;
   a protective boot extending longitudinally of said at least one support member and surrounding said external surface thereof;
   end regions on said boot, one of said end regions being connected to said at least one support member; and
   a carrier member extending through said partition and engaged by adjacent portions of said boot and diaphragm for connecting the other end of said protective boot to said partition.

2. A servo booster as claimed in claim 1 wherein:
   respective formations are provided in said carrier member; and
   said adjacent portions of said boot and diaphragm are press-fitted into respective ones of said formations.

3. A servo booster as claimed in claim 1 wherein said carrier member surrounds said at least one support member in radially spaced relationship.

4. A servo booster as claimed in claim 3 wherein:
   said boot surrounds said at least one support member in spaced relationship, and has a portion thereof extending within said carrier member;
   an internal groove is provided in said carrier member; and
   a part of said boot portion extends substantially radially outwardly into said internal groove.

5. A servo booster as claimed in claim 3 wherein:
   an axially projecting annular rib is provided on said diaphragm surrounding said at least one support member and engaging an opposed surface on said carrier member to provide a seal between said chambers.

6. A servo booster as claimed in claim 1 wherein:
   said carrier member has a main body and includes a retention device acting to hold said boot and diaphragm in place on said main body.

7. A servo booster as claimed in claim 1 wherein said carrier member is slidably engaged on said at least one support member to provide additional support for said movable partition.

8. A servo booster as claimed in claim 7 and further comprising:
   communication passage means extending through said carrier member for communicating the inside of said protective boot with the chamber on the side of said carrier member opposite to said boot.

9. A servo booster as claimed in claim 1 wherein:
said diaphragm is on one side of said partition; and
said other end of said boot is connected to said carrier member at the opposite side of said partition from said diaphragm.

10. A servo booster as claimed in claim 2 wherein:
said respective formations comprise spaced grooves in the outer surface of said carrier member; and
a radially inwardly projecting bead is provided on said boot engaging in one of said grooves.

11. A servo booster as claimed in claim 9 wherein said carrier member surrounds said at least one support member in radially spaced relationship.

12. A servo booster as claimed in claim 10 wherein said carrier member surrounds said at least one support member in radially spaced relationship.

13. A servo booster as claimed in claim 12 wherein:
at least one hole is provided through said partition; and
said carrier member is disposed in said at least one hole with the periphery of said at least one hole in the other of said grooves.

14. A servo booster as claimed in claim 2 wherein:
at least one hole is provided through said partition; and
said carrier member is disposed in said at least one hole.

15. A brake servo booster comprising:
a housing;
a movable partition in said housing dividing said housing into a pair of chambers, said partition including a diaphragm secured in sealing relationship to said housing and forming a diaphragm assembly operatively connected to a force output member for the transmission of a power assistance force to a brake master cylinder;
at least one support member extending through said partition for connecting the booster, in use, to a fixed support, said at least one support member having an external surface;
a protective boot extending longitudinally of said at least one support member and surrounding said external surface thereof;
end regions on said boot, one of said end regions being connected to said at least one support member;
a carrier member having a main body connecting the other end of said protective boot to an adjacent portion of said diaphragm assembly; and
a retention device comprising a threaded spigot on said carrier member, and a nut threadedly engaged on said threaded spigot acting to clamp said other end of said boot and said adjacent portion of said diaphragm assembly in place on said main body of said carrier.

16. A brake servo booster comprising:
a housing;
a movable partition in said housing dividing said housing into a pair of chambers, said partition including a diaphragm secured in sealing relationship to said housing and forming a diaphragm assembly operatively connected to a force output member for the transmission of a power assistance force to a brake master cylinder;
at least one support member extending through said partition for connecting the booster, in use, to a fixed support, said at least one support member having an external surface;
a protective boot extending longitudinally of said at least one support member and surrounding said external surface thereof;
end regions on said boot, one of said end regions being connected to said at least one support member;
a carrier member having a main body connecting the other end of said protective boot to an adjacent portion of said diaphragm assembly; and
a retention device comprising a projecting shoulder on said main body of said carrier member, a clamping ring surrounding part of said main body, a cylindrical portion on said clamping ring extending over part of said boot engaged with said main body, and a further portion on said clamping ring snap-engaging with said projecting shoulder for retaining said clamping ring on said main body in a position for clamping said diaphragm assembly against an opposed part of said main body.

17. A servo booster as claimed in claim 16 wherein:
an outwardly projecting ramp means is provided on said main body terminating in said projecting shoulder; and
a snap engaging portion is provided on said clamping ring for sliding engagement with said ramp means upon axial movement of said clamping ring over said main body into clamping position so that said snap engaging portion is resiliently expanded prior to said snap-engaging with said projecting shoulder.

* * * * *